United States Patent [19]
Christenberry, Jr.

[11] 3,775,867
[45] Dec. 4, 1973

[54] INSTRUCTIONAL DISPLAY DEVICE

[76] Inventor: Thomas T. Christenberry, Jr., 932 Henley Pl., Charlotte, N.C. 28207

[22] Filed: July 18, 1972

[21] Appl. No.: 272,773

[52] U.S. Cl............ 35/17, 35/35 E, 46/34, 281/15 R, 281/38
[51] Int. Cl........................... G09b 23/30
[58] Field of Search............ 35/17, 35 E, 47; 40/1; 46/34; 281/38, 15 R

[56] References Cited
UNITED STATES PATENTS

| | | | |
|---|---|---|---|
| 2,188,041 | 1/1940 | Gallup | 35/47 |
| 3,289,333 | 12/1966 | Watrous | 40/1 |
| 3,348,319 | 10/1967 | Harrison | 35/17 X |
| 3,704,529 | 12/1972 | Cioppa | 35/17 |

*Primary Examiner*—Harland S. Skogquist
*Attorney*—Channing L. Richards et al.

[57] ABSTRACT

An instructional display device for use in teaching and in operating teleorentgenography equipment, including a hollow rubber facsimile of a part of the human body attached to a support and a thin rod extending through the facsimile in a predetermined path. The hollow facsimile is arranged to assume an expanded position at which the rod simulates the path of an X-ray beam, and a compressed position at which the facsimile is conveniently stored in a box-like container or against the back surface of an adjacent support member. The support member may also include a representation of an actual X-ray photograph taken of such part of the human body along a line corresponding to the path of the rod through the expanded facsimile. Also, written materials may be provided for indicating the purpose and procedure for taking the particular X-ray indicated by the display device.

6 Claims, 6 Drawing Figures

PATENTED DEC 4 1973 3,775,867

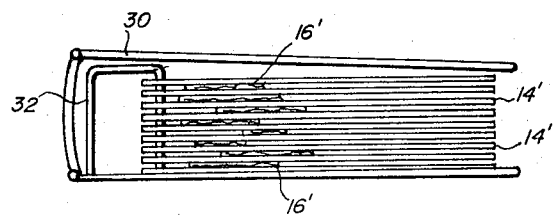
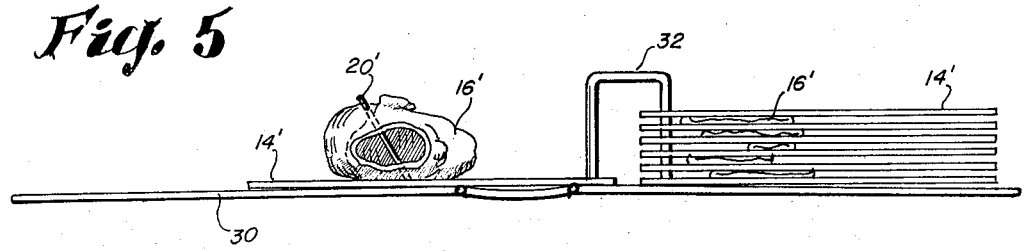
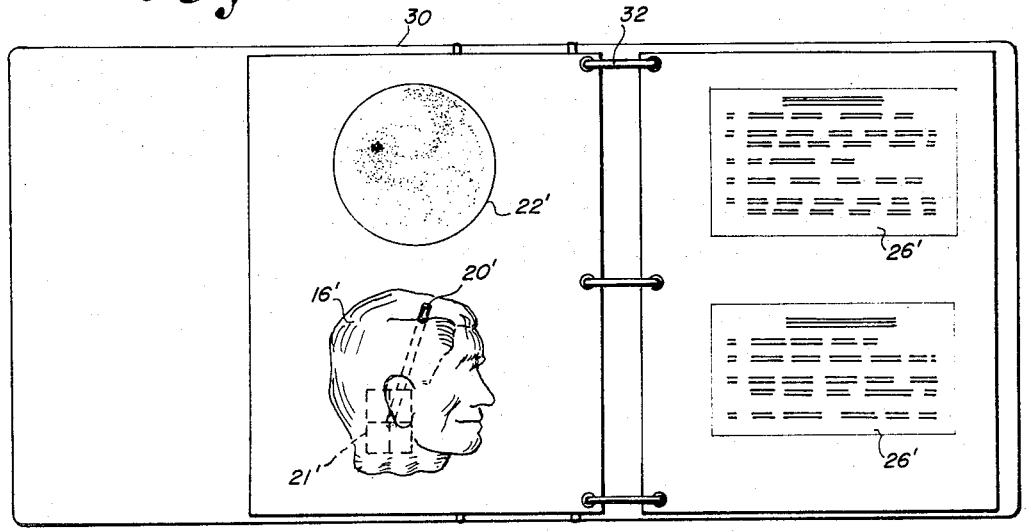

INSTRUCTIONAL DISPLAY DEVICE

BACKGROUND OF THE INVENTION

As is well known, electromagnetic ray generators are now universally used by physicians in diagnosing and treating an infinite variety of maladies of the human body. These electromagnetic rays, such as X-rays, penetrate the human body and, when properly directed, can be employed to provide the physician with a "picture" or X-ray photograph of internal portions of the human body not otherwise visible to the physician. A common example of this type of use of X-ray machines is to locate and define internal tumors.

Because internal maladies may occur in substantially all parts of the human body, it is practically impossible for X-ray machine operators to be familiar with the infinite variety of different techniques used in obtaining X-ray photographs of particular areas of the human body. Moreover, in the modern practice of medicine the task of obtaining X-ray photographs is usually turned over to technicians who are specially trained in the use of the X-ray equipment, but these technicians are usually not professional physicians. These technicians are told the particular area to be investigated, and the techniques and details of obtaining the desired X-ray photographs are left to the expertise of the technician. As a result, the technician must be familiar with the purposes for which a wide variety of requested X-ray photographs are to be used, and he must be able to direct properly the radiation beam to assure that the area under investigation will be clearly shown on the X-ray photographs obtained.

Heretofore, only conventional treatises and similar instructional materials were available to the technician in assisting him in determining the proper position of a patient with respect to the radiation beam generated by the X-ray equipment. However, because of the great variety of possible areas to be investigated, such conventional materials are often of little value to the technician who is faced with a particular problem of photographing a specific internal area of the body.

In accordance with the present invention, an instructional display may be provided which visually demonstrates exactly how X-ray photographs can be obtained of specific portions of the human body.

SUMMARY OF THE INVENTION

In accordance with the present invention, it is proposed that a large number of display devices can be made available to X-ray technicians, each display being designed to assist the technician in obtaining an X-ray photograph of a specific area of the human body. When the technician is required to obtain X-ray photographs of such a specific area, he will choose the display device prepared for this area and thereby have a convenient and accurate reference guide to assist him in obtaining the exact X-ray photographs required.

Each such display device includes a three-dimensional facsimile of a particular part of the human anatomy (i.e., the head, the liver, etc.). This facsimile is secured to a support surface, and a thin rod element is arranged to extend through the three-dimensional facsimile in a predetermined path which simulates the path of a radiation beam passing through the part of the human body represented by the facsimile. Also, an actual X-ray photograph taken along the path simulated by the rod element is presented on the support surface adjacent the facsimile.

Thus, the technician who is seeking to obtain an X-ray photograph of a particular area will, when using the display device of the present invention, have a visual reference showing exactly the proper path which the radiation beam should take, as well as an actual X-ray photograph which can be used to verify the accuracy of the X-ray photograph obtained by the technician.

As mentioned above, it is desirable to provide the technician with a large number of such displays, each relating to a different area of the human body, whereby the technician will be able to use such a display in dealing with most if not all of the areas which he is called upon to photograph. Accordingly, the display devices of the present invention are constructed to that when they are in use, they are sufficiently large to provide the technician with the details needed to assist him properly, yet they may be substantially reduced in overall bulk when not in use whereby even a large number of such display devices may be conveniently stored in a relatively small space.

Thus, the three-dimensional facsimile of a particular display device is formed of a flexible and resilient material and it is hollow so as to permit the facsimile to assume a fully expanded disposition projecting substantially outwardly from the support member whereby the facsimile may be readily referred to; and this flexible and resilient material also permits the facsimile to assume a compressed disposition for convenient storage.

To facilitate storage, the support member to which the facsimile is secured may be used as a top for a box-like container having a shallow depth corresponding to the thickness of the facsimile in its aforementioned compressed disposition. Thus, when the support member top is closed, the compressed facsimile will be contained within the box-like container which can be stored in a small area.

Also, another embodiment of the present invention is disclosed in which a plurality of support members, each having a different facsimile secured thereto, are arranged as page-like elements in a binder with each facsimile being normally compressed between adjacent support member and being individually and selectively expandable as the support members are serially moved to a position at which the facsimile secured thereto is not compressed by an adjacent support member.

Finally, the display device of the present invention includes written materials in close proximity to the facsimile and X-ray photograph, these written materials providing the technician with instructional information as to how the particular X-ray photographs in question should be obtained and the general purpose of obtaining such X-ray photographs.

BRIEF DESCRIPTION OF THE DRAWINGS

FIG. 4 is a side elevational view of a second embodiment of the display device of the present invention;

FIG. 5 is a further side elevational view of the display device illustrated in FIG. 4, with one of the page-like support members shown at a position with the facsimile secured thereto at the expanded position; and FIG. 6 is a plan view of the display device illustrated in FIG. 5.

DESCRIPTION OF THE PREFERRED EMBODIMENTS

Figure 1:
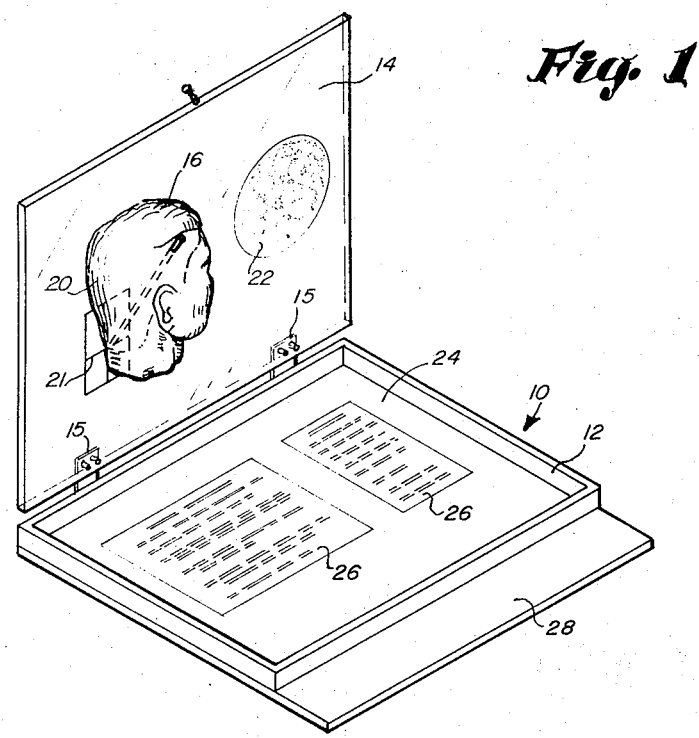
FIG. 1 is an overall perspective view of the preferred embodiment of the instructional display device of the present invention.
Figure 2:
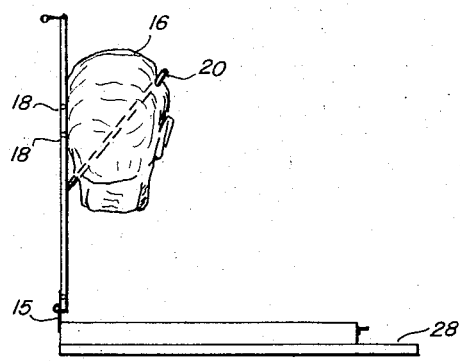
FIG. 2 is a side elevational view of the display device illustrated in FIG. 1.
Figure 3:
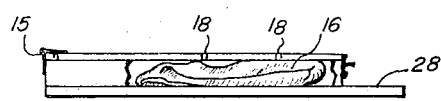
FIG. 3 is a further side elevational view of the display device illustrated in FIG. 1 with the top of the box-like container closed.

Looking now in greater detail at the accompanying drawings, FIGS. 1-3 illustrate an instructional display device 10 which includes a box-like container 12 and a top member 14 attached thereto by hinged connections 15 whereby the top member 14 can be selectively moved between an open position as shown in FIGS. 1 and 2, and a closed position as shown in FIG. 3.

The top member 14 is formed of clear plastic, and it acts as a support member for a facsimile 16 of a part of the human anatomy such as the head which is illustrated, and this facsimile 16 is secured to one surface of the top member 14 by small screws 18. The facsimile 16 is formed of a thin, flexible, and resilient material such as rubber, and the facsimile 16 is hollow and molded to normally assume an expanded position as shown in FIGS. 1 and 2 at which the facsimile 16 has a three-dimensional shape corresponding to the part of the human anatomy (i.e., the head) represented thereby.

A thin rod element 20 extends in linear fashion through a predetermined portion of the facsimile 16 for simulating the path of a radiation beam passing through the body part represented by the facsimile 16. The path of the rod element 20 is selected in dependence upon the purpose of the X-ray photograph to be obtained and the exact area to be photographed. Thus, in the particular facsimile 16 shown in FIG. 1 an X-ray is to be obtained of the mastoid cells, for example, using the modified lysholm position. It is to be understood, of course, that the showing of FIG. 1 is simply exemplary of a substantially infinite variety of possible combinations of body parts and X-ray beam paths which can be presented by the display device of the present invention.

The rod element 20 is preferable formed of hard rubber and both its ends extend slightly beyond the confines of facsimile 16 as best seen in FIG. 2. Since the top member 14 is clear, the technician can see exactly where the radiation beam should exit, and a cross hair marker 21 may be provided on the top member 14 to mark this point. Also, the rod element 20 is supported solely by the rubber facsimile 16 so that it will readily collapse therewith.

Adjacent to the facsimile 16 on the top member 14 is an actual X-ray photograph 22 taken of the part of the human body represented by the facsimile 16 along the path simulated by the rod element 20.

The box-like container 12 has a bottom surface 24 on which are fixed written instructional materials 26 relating to the technique and purposes of obtaining X-ray photographs of the area penetrated by the rod element 20 in the facsimile 16. Also, the bottom surface 24 has an extending portion 28 projecting out beyond the general confines of the box-like container 12, and this extending portion may be used to receive a label (not shown) identifying the subject matter to the materials within the container 12, as well as for handling purposes if a number of containers 12 are located together on a shelf or the like to provide a complete library of different display devices.

In commercial embodiments of the present invention, it is anticipated that large numbers of display devices having different facsimiles 16 will be located or stored at one area in library form, and a technician will have access to this library and can select the particular display device which will assist him best in obtaining a desired X-ray photograph of a patient. It is, therefore, apparent that minimum space requirements for the display devices 10 is very important, yet the facsimile 16 must be large enough to provide the technician with a clear demonstration of the part of the anatomy being photographed and the path of the radiation beam therethrough.

The display devices 10 answer both of these requirements because, as seen in FIGS. 1 and 2, the fully expanded facsimile 16 and rod element 20 provide a large scale representation of exactly what the technician needs to visualize. Moreover, because the facsimile 16 is hollow and is formed of resilient material such as rubber, it will readily assume a collapsed disposition substantially flush against the surface of the top member 14 when the top member 14 is closed upon the container 12. The container 12 has a very shallow depth that corresponds to the thickness of the facsimile 16 in its collapsed disposition. Thus, when the top member 14 is at its open position as shown in FIGS. 1 and 2, the facsimile 16 assumes a fully expanded disposition for viewing by the technician, and when the top member 14 is closed as shown in FIG. 3, the facsimile 16 is pressed to its fully compressed disposition by the container 12 so as to occupy only a small fraction of the space it occupies when fully expanded. It is to be noted that because the rod element 20 is attached solely to the facsimile 16 as previously described, it will assume a position substantially parallel and adjacent to the top member 14 when the facsimile 16 is pressed to its collapsed disposition. Therefore, the closed display device 10 shown in FIG. 3 may be conveniently stored together with a large number of similar display devices with only minimum space requirements.

In FIGS. 4-6 there is illustrated another embodiment of the present invention which includes a notebook-type binder 30 having a U-shaped guide element 32 carried thereby. A plurality of support members 14', each having holes therein, are slidably mounted on the guide element 32 in page-like fashion. Each support member 14' has secured to one side thereof a facsimile 16' having a rod element 20' arranged just as in first embodiment, and a photographic representation 22' is likewise located adjacent the facsimile 16'. The back surface of each support member 14' has attached thereto written instructions 26', and it will be noted in FIG. 6 that these written instructions 26' on the back of one support member 14' are used with the facsimile 16' on the front side of an adjacent support member 14'.

As seen in FIG. 4, the binder 30 may be closed so that all of the facsimiles 16' are pressed into their collapsed disposition by an adjacent support member 14', and a very small amount of storage space is required for the plurality of facsimiles 16'. However, the technician may open the binder 30 and selectively slide an individual support member 14' about the guide 32 to a position as shown in FIGS. 5 and 6 where the facsimile 16' is not compressed by an adjacent support member 14' whereupon the facsimile 16' will assume its fully expanded disposition and both the photograph 22' and the written materials 26' relating to such facsimile 16' will be available for convenient reference by the technician. Thus, as with the first embodiment, the display devices may be easily stored in a small space, yet each display device may be selectively arranged with the facsimile 16' thereof displayed in a fully expanded disposition for accurate reference.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. An instructional display device including a support member, a three-dimensional facsimile of a part of the human anatomy secured to a surface of said support member, said facsimile being formed of a flexible material and being hollow to permit said facsimile to assume an expanded disposition projecting substantially outwardly from said support member surface and a compressed disposition substantially flat against said support member surface, linear means extending through a predetermined portion of said hollow facsimile in said expanded disposition thereof for simulating the path of a radiation beam passing through said facsimile, said linear means being arranged to be parallel to and adjacent said support member surface in said compressed disposition of said facsimile, and pressing means for selectively compressing said facsimile against said support member surface.

2. An instructional display device as defined in claim 1 and further characterized in that said support member has attached thereto a representation of an actual X-ray photograph taken of said part of the human anatomy along the line corresponding to the path defined by said linear means through said facsimile.

3. An instructional display device as defined in claim 1 and further characterized in that said linear means comprises a small rod supported solely by said facsimile whereby said rod is free to be parallel and adjacent said support member surface when said facsimile is at said compressed disposition thereof.

4. An instructional display device as defined in claim 3 and further characterized in that both ends of said rod extend slightly beyond said facsimile, and in that said support member is formed of a clear material whereby the end of said rod nearest said support member will be visible from the surface of said support opposite to said surface to which said facsimile is secured.

5. An instructional display device as defined in claim 1 and further characterized in that said means for selectively pressing said facsimile to the compressed disposition thereof includes a box-like container having an open top and a depth corresponding substantially to the thickness of said facsimile in the compressed disposition thereof, and in that said support member is mounted with a hinged connector to said box-like container for selective movement between a first open position at which said facsimile assumes said expanded disposition thereof and a second position closing the open top of said box-like container and pressing the said facsimile to said compressed disposition thereof within said box-like container.

6. An instructional display device as defined in claim 1 and further characterized in that said support member and said pressing means are slidably mounted on guide means permitting said support member to be selectively located at a first position at which said facsimile is compressed between said support member and said pressing means and a second position at which said pressing means is spaced from said support means to permit said facsimile to assume said expanded disposition thereof.

* * * * *